Oct. 24, 1961 H. C. HANSEN 3,005,636

RECORD FEEDING ARRANGEMENT BY THE TONE ARM

Filed June 30, 1954 9 Sheets-Sheet 1

INVENTOR.
HANS CHRISTIAN HANSEN
BY
Dicke, Craig & Freudenberg
ATTORNEYS

Oct. 24, 1961 H. C. HANSEN 3,005,636

RECORD FEEDING ARRANGEMENT BY THE TONE ARM

Filed June 30, 1954 9 Sheets-Sheet 2

INVENTOR.
HANS CHRISTIAN HANSEN
BY
Dicke, Craig & Freudenberg
ATTORNEYS

Oct. 24, 1961 H. C. HANSEN 3,005,636

RECORD FEEDING ARRANGEMENT BY THE TONE ARM

Filed June 30, 1954 9 Sheets-Sheet 3

INVENTOR.

HANS CHRISTIAN HANSEN

BY

Dicke, Craig & Freudenberg

ATTORNEYS

RECORD FEEDING ARRANGEMENT BY THE TONE ARM

Filed June 30, 1954

INVENTOR.
HANS CHRISTIAN HANSEN
BY
Dicke, Craig & Freudenberg
ATTORNEYS

Oct. 24, 1961 H. C. HANSEN 3,005,636

RECORD FEEDING ARRANGEMENT BY THE TONE ARM

Filed June 30, 1954 9 Sheets-Sheet 5

INVENTOR.
HANS CHRISTIAN HANSEN
BY
Dicke, Craig & Freudenberg
ATTORNEYS

RECORD FEEDING ARRANGEMENT BY THE TONE ARM

Filed June 30, 1954 9 Sheets-Sheet 6

*INVENTOR.*
HANS CHRISTIAN HANSEN
*BY*
Dicke, Craig & Freudenberg
*ATTORNEYS*

INVENTOR.
HANS CHRISTIAN HANSEN
BY
Dicke, Craig & Freudenberg
ATTORNEYS

INVENTOR.
HANS CHRISTIAN HANSEN
BY
Dicke, Craig & Freudenberg
ATTORNEYS

INVENTOR.
HANS CHRISTIAN HANSEN
BY
Dicke, Craig & Freudenberg
ATTORNEYS

United States Patent Office 3,005,636

Patented Oct. 24, 1961

3,005,636

RECORD FEEDING ARRANGEMENT BY THE TONE ARM

Hans Christian Hansen, 38 Slotsvej Charlottenlund, Copenhagen, Denmark

Filed June 30, 1954, Ser. No. 440,487
Claims priority, application Denmark June 30, 1953
26 Claims. (Cl. 274—10)

This is a continuation-in-part application of my application Serial No. 226,946, filed May 12, 1951, and relates more specificly to a record feeding arrangement.

It is one purpose of my invention to provide an automatic phonograph mechanism which has a few movable parts and mechanical connections between the different cycle control for parts and will be able to automatically play in arbitrary sequence records of different sizes.

It is a further purpose of my invention to provide an automatic phonograph in which the records are supported on a platform above the turntable and adapted to be relieved in sequence by being sidewardly displaced and in which a simple and efficient mechanism for displacing the records to be dropped to the turntable is provided.

It is a further object of the invention to provide a phonograph in which the tone arm itself is designed to form that element which causes sideward displacement of the records supported on a platform above the turntable for controlling drop of the records to the turntable.

It is a further object of the invention to provide a phonograph in which the tone arm has an ejector knob operable to engage the edge of the lowest record in a stack supported above the turntable and in which means is provided for securing safe engagement between said ejector knob and the edge of the record to allow the record to be sidewardly displaced for the purpose of being dropped to the turntable.

Still a further purpose of the invention is to provide a record drop control arrangement for an automatic phonograph having a tone arm including an ejector knob operable to engage the edge of the lowest record in a stack supported above the turntable for sidewardly displacing said record to cause it to be dropped to the turntable, and in which a variable height of said ejector knob can be caused to engage the edge of the record depending on the size of the record.

Still a further purpose of my invention is to provide a drop control arrangement as referred to in the preceding paragraph in which a substantial part of the height of the ejector knob can be caused to engage 10″ and 12″ records, being normally of a thickness of the magnitude of ⅛″, and in which a reduced height of the ejector knob can be brought to engage the edge of a 7″ record, the thickness of which is of the magnitude 1/10″.

Still a further object of my invention is to provide a record feeding mechanism to effect feeding of the records from the magazine to the turntable which is very simple in construction, and in which a special control member for the feeding movement is avoided so as to thereby simplify the whole construction.

Figure 1:
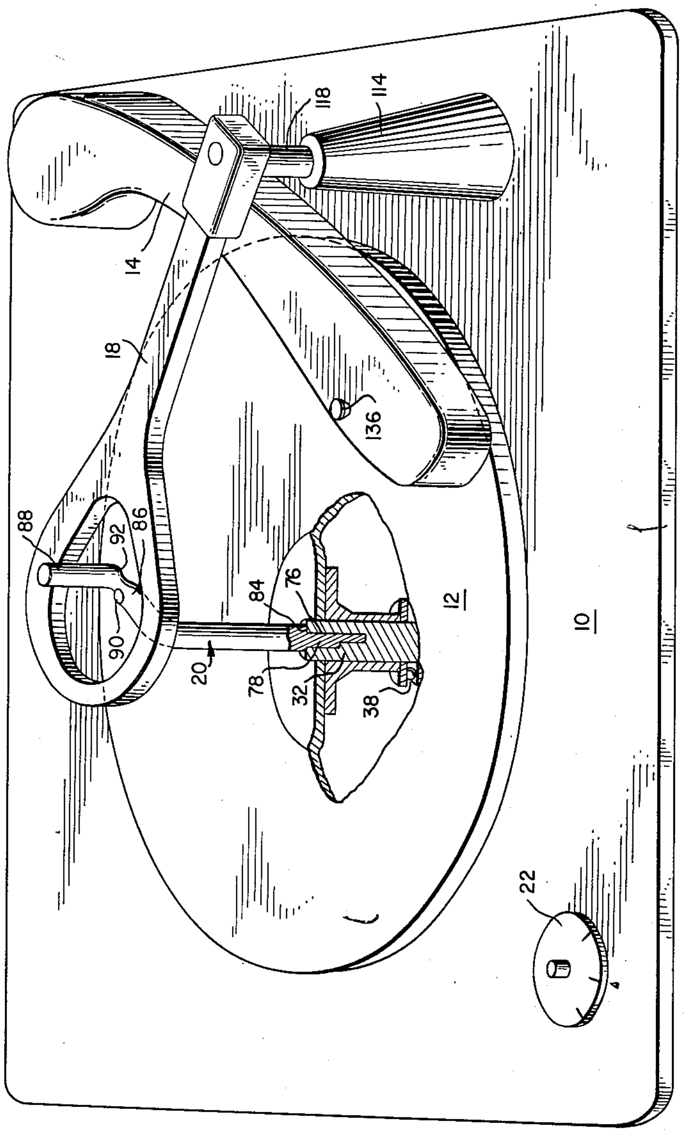
Figure 2:
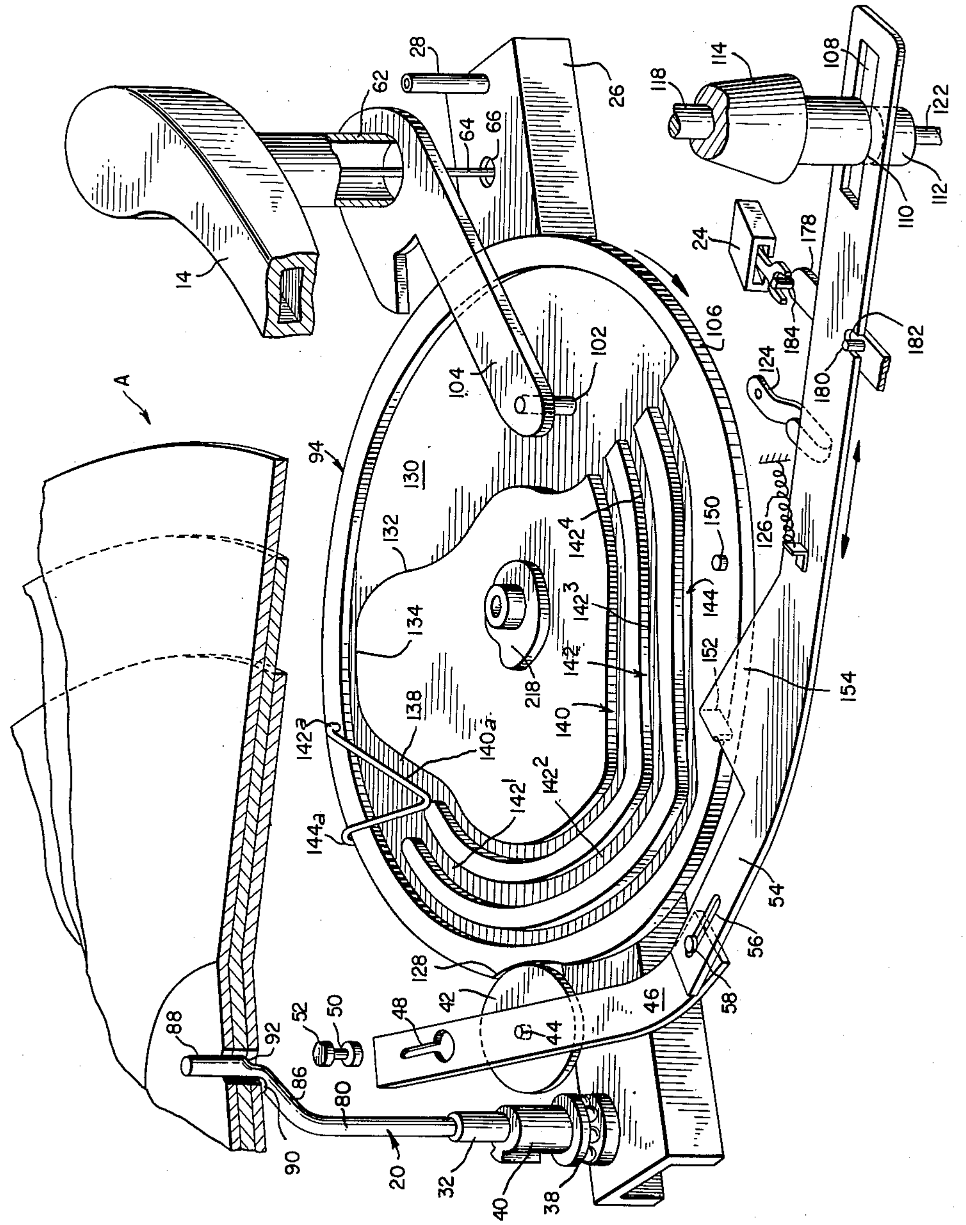
Figure 3:
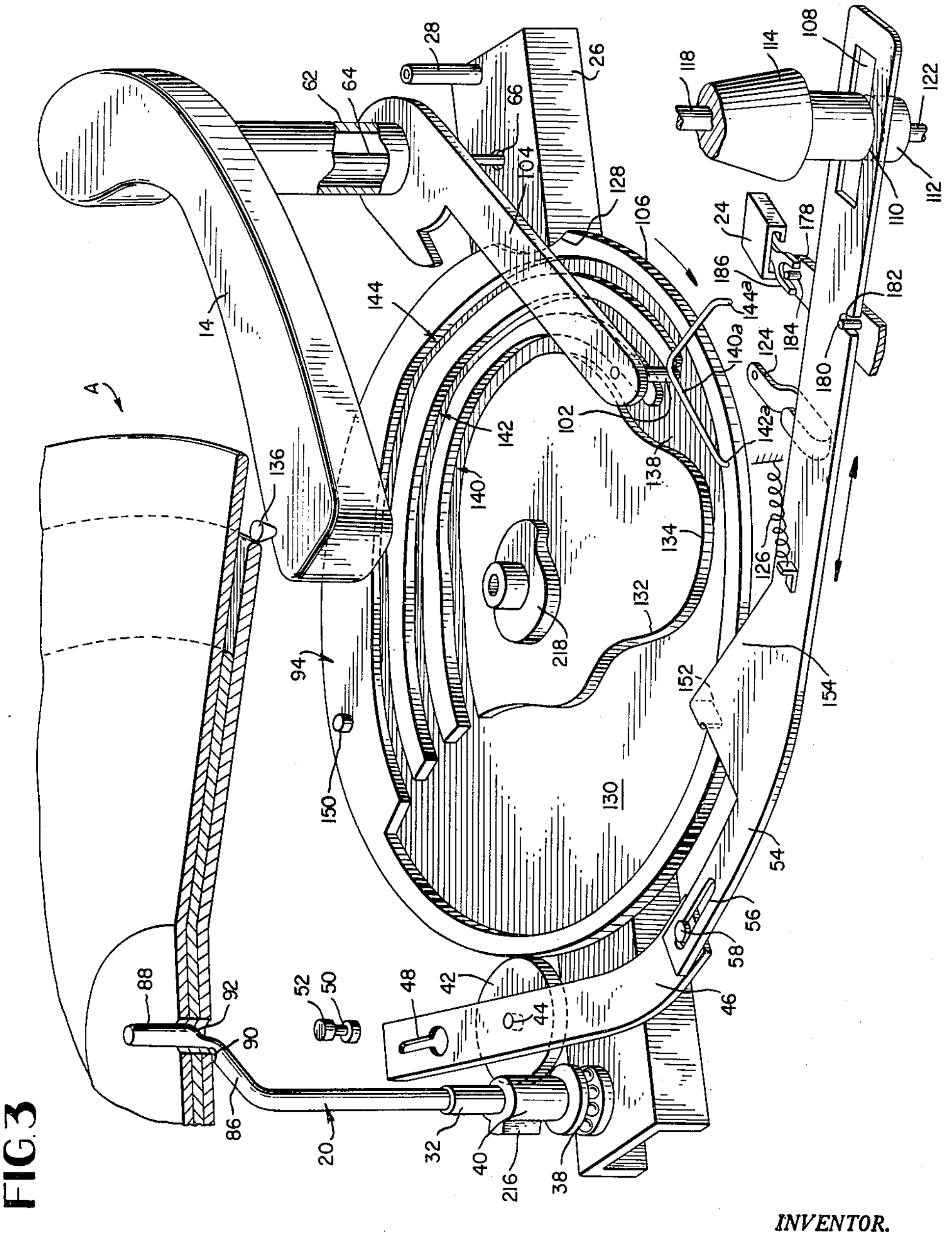
Figure 4:
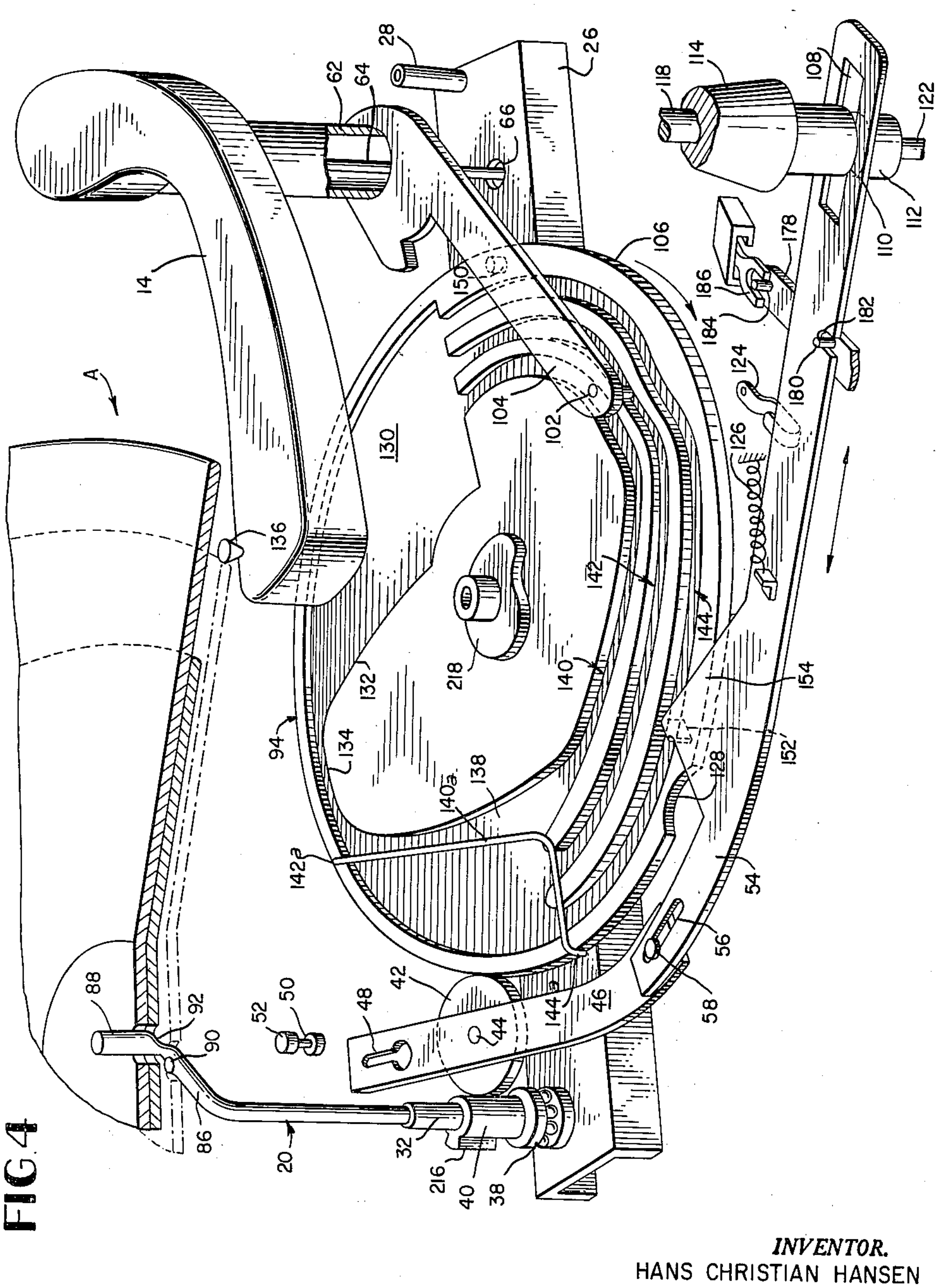
Figure 5:
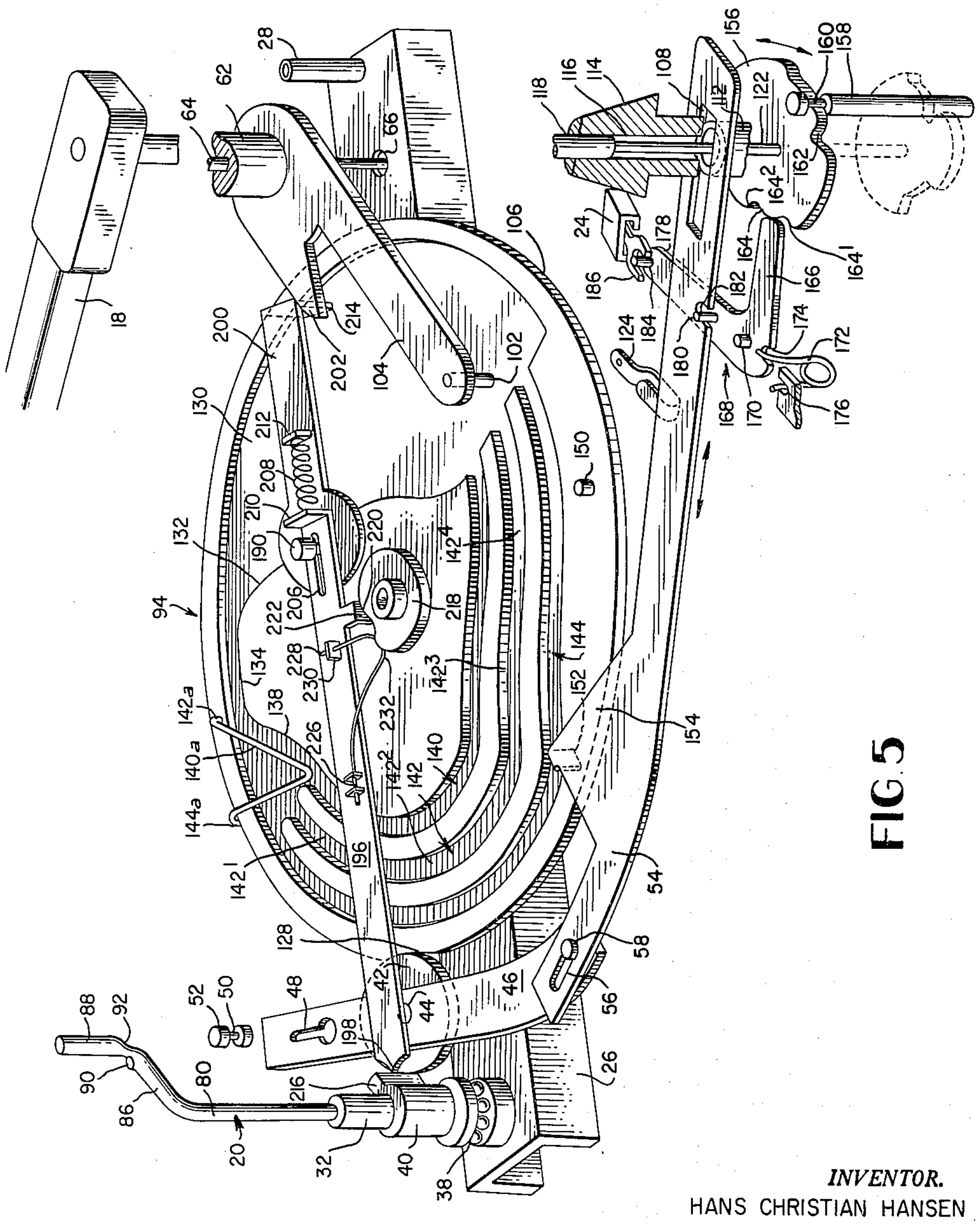
Figure 6:
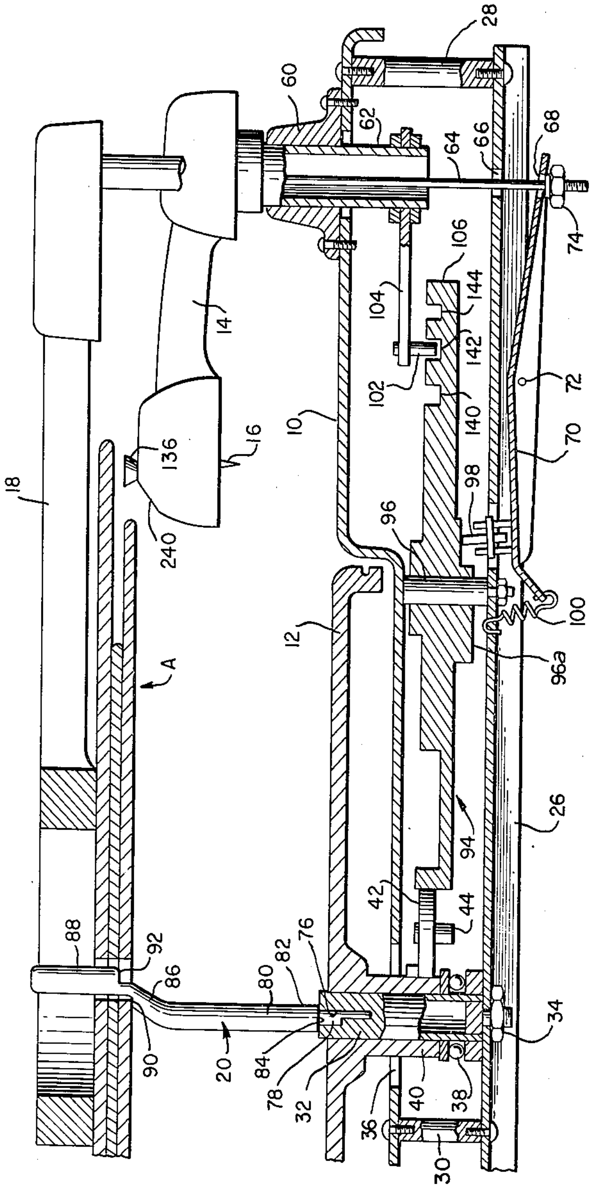
Figure 7:
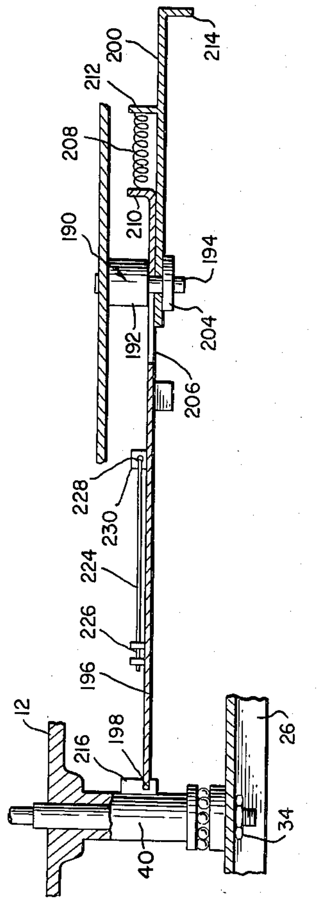
Figures 8, 9, 10, 11:
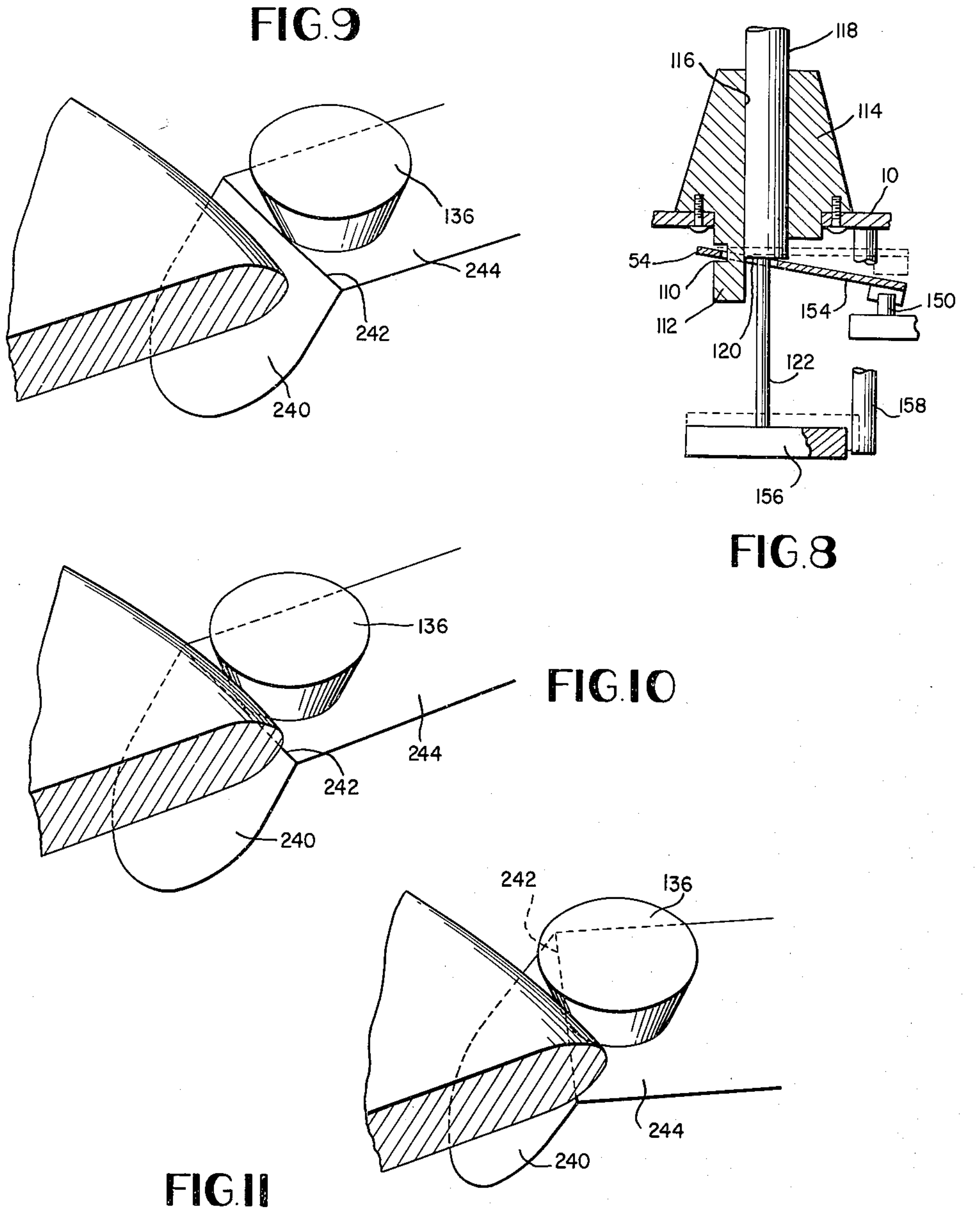
Figure 13:
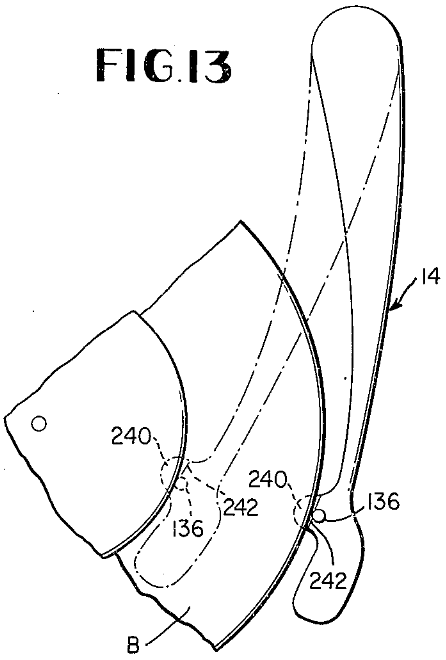
Figure 12:
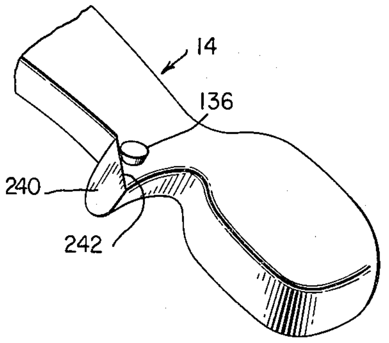
Figures 16, 17:
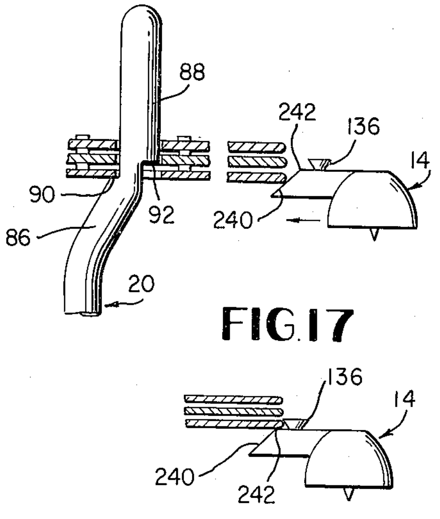
Figure 14:
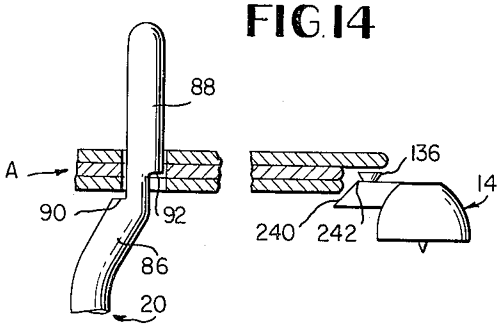
Figure 15:
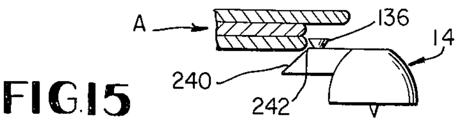
Figure 18:
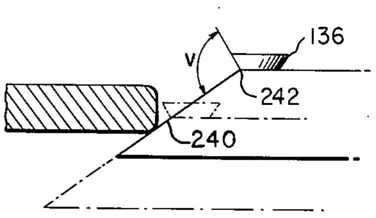
Figure 19:
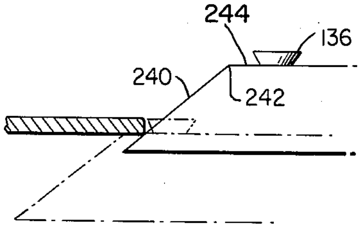
Figure 20:
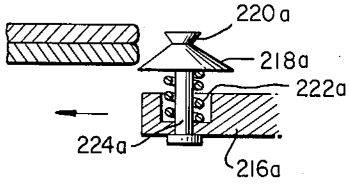
Figure 21:
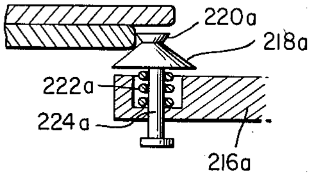
Figure 22:
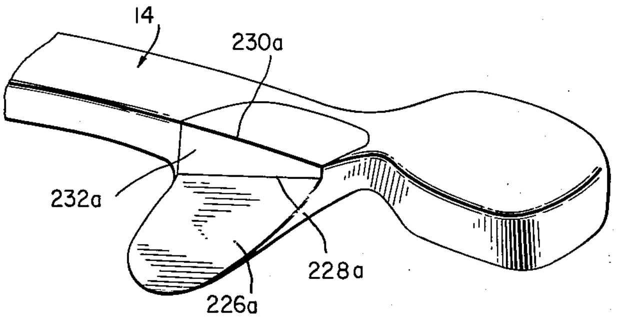

The invention will now be described in detail with reference to the accompanying drawing in which FIGURE 1 is a perspective top view of a phonograph according to the invention, partly in section, FIGURE 2 is a perspective view of the essential parts of the phonograph showing the control mechanism in one position, FIGURE 3 is a similar perspective view showing the parts in another position, FIGURE 4 is a similar perspective view showing the parts in still another position, FIGURE 5 is a perspective view of further parts of the phonograph according to the invention, specificly illustrating the trip starter arrangement, FIGURE 6 is a vertical section through the phonograph along a line passing through the turntable spindle, the center of the cam disc and the tone arm spindle, FIGURE 7 is a vertical section through the trip starter arrangement shown in FIGURE 5, FIGURE 8 is a vertical section through the lower end of the ballast arm spindle perpendicular to the direction of the stop and start control arm, FIGURE 9 is a perspective view in enlarged scale showing the record ejector knob in its position of approach to a large size record, FIGURE 10 is a similar perspective view showing the ejector knob engaging the record in FIGURE 9, FIGURE 11 is a perspective view in similarity with FIGURE 10 showing the engagement with a small size record, FIGURE 12 is a perspective view of the record ejector arrangement according to the present invention, FIGURE 13 is a plan view of the record ejector arrangement with the record ejecting member in two positions, FIGURE 14 is an end view of the record rejecting arrangement showing the parts in the position thereof prior to engagement with a large-size record, FIGURE 15 is a corresponding end view similar to FIGURE 14 showing the engagement with a large-size record, FIGURE 16 is an end view of the record ejector arrangement showing the parts in the respective position thereof prior to engagement with a small-size record, FIGURE 17 is a corresponding end view, similar to FIGURE 16, showing the engagement with a small-size record, FIGURE 18 is a schematic illustration, on a larger scale, illustrating the engagement between the record ejector member and a large-size record in two different positions thereof, FIGURE 19 is a corresponding schematic end view, similar to FIGURE 18, showing the engagement between the record ejector member and a small-size record, FIGURE 20 is a partial cross sectional view of a modified record ejector arrangement according to the present invention in one position thereof, FIGURE 21 is a partial cross sectional view, similar to FIGURE 20, and showing the parts thereof in another position, and FIGURE 22 is a perspective view of a further modified embodiment of a record ejector member according to the present invention.

The phonograph includes a base plate or chassis 10. Above the top surface of the chassis extends a turntable 12. Another of the main elements of the phonograph is the tone arm 14 including a stylus member 16, see FIGURE 6. A further main element of the phonograph is a record stabilizing or ballast arm 18 adapted to engage the top surface of a stack of records supported on a center spindle generally designated by reference numeral 20. The turntable is driven from an electric motor (not shown) at a preselectable number of different speeds which can be set by means of a speed control knob 22. To start and stop the phonograph a switch 24 (FIGURES 2–5) is included in the electric circuit of the motor.

Below the base plate or chassis is arranged a rail 26 which forms a supporting bridge for some of the parts of the phonograph. The rail or bridge 26 is secured below the chassis 10 by means of distance pieces 28 and 30, see FIGURE 6.

The turntable 12 is rotatably arranged on a spindle 32 which at its lower end by means of a nut or the like 34 is fastened to the bridge 26 and which extends up through an aperture 36 in the chassis 10, see most clearly the section FIGURE 6. The lower end of the spindle 32 is surrounded by a ball bearing 38, the top of which is engaged by the lower end of a hollow bushing 40 which is connected with the turntable 12 and by means of which the turntable is rotatably supported on the stationary turntable spindle 32.

The record change cycle mechanism is driven from the continuously rotating turntable bushing 40 through an engageable and disengageable intermediate gear wheel 42 which is rotatably arranged on a pin 44 firmly secured to a lever 46. The lever 46 has a key-hole like aperture 48 at one end thereof and is at this end supported on a pin 52 which is firmly secured and extends below the chassis 10 and which has an annular groove 50 which engages in the narrow portion of the key-hole like aperture 48. This arrangement also allows lengthwise displacement of the lever 46 for the purpose to be explained later.

The other end of the lever 46 is supported on a stop and start control arm 54 which has a slot 56 through which extends a pin 58 on the lever 46, said pin having a head above the top surface of the arm 54. It will be appreciated that the pin-and-slot connection 56, 58 also allows lengthwise movement of the lever 46.

The tone arm 14 is swingingly arranged in a bushing 60 (FIGURE 6) secured to the chassis 10. The tone arm spindle is in the form of a hollow tubular member 62 on the top end of which the tone arm is supported in a convenient manner known to those skilled in the art and therefore not shown in detail and which also allows the tone arm to be raised and lowered by means of a control rod 64 which passes down through the hollow tone arm spindle 62.

The control rod 64 passes down through an aperture 66 in the bridge 26 as well as through an aperture 68 in a raising control lever 70 which by means of a pin or the like 72 is supported on the bridge 26 so that it can swing in a vertical plane. The lower end of the control rod 64 is screw-threaded and provided with an adjustable nut or the like 74 adapted to be engaged by the right hand end of the raising lever 70 to raise the tone arm when the raising lever is swung clockwise, see FIGURE 6, and to lower the tone arm for being deposited with the stylus 16 in engagement with a record supported on the turntable when the raising lever is swung anticlockwise to disengage its right hand end from the top of the nut 74.

In the top of the stationary turntable spindle 32 a bore 76 is provided, the lower end of which is flattened and adapted to receive a correspondingly formed lower end 78 of a center spindle 80 in order to hold the center spindle against rotation. The lower end 82 of the center spindle is substantially cylindrical and terminates at the bottom in a shoulder 84 by means of which the center spindle engages the top of the spindle 32.

Above the cylindrical portion 82 the center spindle has an inclined portion 86 which continues in an upper cylindrical portion 88 extending parallel with the lower portion 82 and perpendicular to the plane of the turntable surface. The top portion 88 of the spindle is eccentrically disposed relative to the lower portion 82 of the center spindle. At the top of the inclined portion 86 the lower portion has an upwardly facing shoulder 90 forming a supporting surface for the stack of records A. The top portion 88 of the spindle terminates in a downwardly facing shoulder 92 which is spaced vertically from the shoulder 90 slightly more than the thickness of a record so as to allow a sideward push of the lowest record to the position in which it is disengaged from the shoulder 90 and allowed to descend along the spindle to the position on the turntable.

The ballast arm 18 serves, when swung in position and lowered to engage the stack of records, to hold the records in horizontal position parallel with the turntable surface.

The main element of the cycle control mechanism which controls the movement of the tone arm is a cam disc 94 which is rotatably mounted on the bridge 26 in the space between the bridge and the chassis 10 by means of a pin 96. The cam disc is caused to rotate one complete revolution between each playing of a record and during this rotation it controls the raising of and lowering of the tone arm by means of a raising control cam portion **96*a* which is located on the underside of the cam disc and which has cam surfaces in various horizontal planes along which rolls a roller 98 mounted on the left hand end of the raising lever 70 during the rotation of the cam disc. The roller 98 is biased against the cam portion 96*a* by means of a spring 100 interposed between the bridge 26 and the left hand end of the raising lever 70 so as to tend to swing the raising lever clockwise and thereby raise the tone arm 14**.

The inward and outward swinging of the tone arm is controlled by means of a plurality of cam tracks in the surface of the cam disc and a cam follower pin 102 on a cam follower arm 104 secured to the tone arm spindle 62.

The rotation of the cam disc 94 is caused by bringing the intermediate gear wheel 42 to engage the periphery 106 of the cam disc as well as the rotating turntable bushing 40.

The stop and start control arm 54 is supported to be moved longitudinally. At the right hand end the arm 54 has a slot 108 the one side of which is guided in a recess 110 laterally disposed in the lower end 112 of a bushing 114 secured in an aperture in the chassis 10. The bushing 114 has a central bore 116 (FIGURE 5) in which a spindle 118 on the top of which the ballast arm 18 is secured is received in such a manner that the ballast arm can swing horizontally and be raised and lowered, see the details shown in FIGURE 8. The ballast arm spindle has a shoulder 120 and below this shoulder the ballast arm spindle has an extension 122 of a reduced diameter which passes down through the slot 108 in the stop-and-start control arm 54 and retains this arm in a position in which a part thereof is engaged in the notch 110 as shown in FIGURE 8.

The stop-and-start control arm is further supported by means of a leaf spring 124 one end of which is secured below the chassis and the other end of which engages the underside of the stop-and-start control arm 54 to retain the latter in substantially horizontal position parallel with the chassis plate. As previously explained the left hand end of the stop-and-start control arm is connected with the lever 46 by means of the pin-and-slot connections 56, 58 and in order to tend to keep the lever 46 in the position in which the gear wheel 42 is in engagement with the periphery of the cam disc 94 as well as with the turntable bushing 40 a spring 126 is interposed between the stop-and-start control arm at some fixed point, for example a pin (not shown) below the chassis tending to pull the stop-and-start control arm towards the right as indicated by the start position by means of arrow shown in FIGURES 2, 3 and 4. It will be understood that hereby a pull is transmitted to the lever 46 causing the driving engagement described.

The disengagement of the gear wheel 42 from its driving connection with the turntable bushing 40 is also caused by the pull of the spring 126 which causes the gear wheel 42 to engage a recess 128 in the periphery of the cam disc so as to thereby disengage the gear wheel 42 from the turntable bushing 40.

The various tracks in the surface of the cam disc which control the swinging movement of the tone arm are as follows:

In the surface of the cam disc is provided a broad and deep track or recess 130 in the following referred to as the playing recess. This recess is so disposed relative to the recess 128 in the periphery of the cam disc that when the latter is stopped after the gear wheel 42 has engaged in the recess 128, the playing recess 130 is in such a position relative to the cam follower pin 102 that the latter can swing freely in the playing recess as the tone arm stylus 16 moves in the sound groove of the record during the playing thereof.

When the cam disc is started by means of the trip starter arrangement shown in FIGURE 5 and to be more fully described in the following the tone arm will immediately be raised.

In the position of rest of the cam disc during the playing of a record the roller 98 on the raising lever 70 is in engagement with a cam portion of the raising cam arrangement 96*a* which is in the lowest plane so that the raising lever 70 is swung sufficiently anticlockwise, see FIGURE 6, to disengage the right hand end of the raising lever from the nut 74. During the first part of rotation of the cam disc and with the cam follower pin still in the playing recess 130 the raising lever roller 98 passes to another portion of the raising cam arrangement 96*a* biased thereagainst by the spring 100 which results in sufficient clockwise swinging of the raising lever 70 to cause the tone arm to be raised from the record to a position in which the tone arm is below the underside of the lowest record in the stack A supported on the centre spindle 80.

When the tone arm has been raised the cam follower pin 102 will be engaged by an outwardly leading wall portion 132 of the playing recess 130 which causes the tone arm to be swung outwards to a position outside the stack of records on the centre spindle. In this position of the tone arm the cam follower 102 is guided through a track 134 near the periphery of the cam disc. During the part of the operation when the cam follower 102 is guided through this track 134, the spring 100 causes still further clockwise tilting of the raising lever 70, the roller 98 passing to a further section of the raising cam arrangement 96*a* in the highest plane so as to lift the tone arm to its most raised position in which it serves to feel the size of the next record to be supplied from a center spindle to the turntable during the following inward movement.

In order to feel the size of the record the tone arm has a feeler abutment 136 operable to engage the edge of the lowest record in the stack on the center spindle 80.

The feeling of the size of the record takes places when the cam follower 102 is caused to move inwardly through a feeler track 138. During the passage of the cam follower 102 in this track 138 the connection between the cam follower and the cam disc is allowed to yield and to thus purpose the exterior wall of the feeler track is according to the embodiment illustrated in the form of a spring 140*a* the one end of which at 144*a* is bent and resiliently held against the periphery of the cam disc, the spring being allowed to be pushed outward turning about the other end 142*a* such as illustrated in FIGURE 3.

The record changing phonograph described is designed to play three predetermined sizes of records, for example 7", 10" and 12" records and is further designed to let the tone arm feeler abutment 136 operate to eject the record by moving the tone arm further inward after the feeler abutment 136 has engaged the edge of the record so as to push it sidewardly to relieve it from the platform 90 on the centre spindle 80.

In order to cause this operation the cam disc is provided with three different cam tracks 140, 142 and 144 corresponding to 7", 10" and 12" records respectively, and each being selectable selectively in response to engagement between the feeler member 136 on the tone arm and the edge of a record of the size in question.

The three tracks 140, 142 and 144 all merge in the playing recess 130 at such different radial distances from the center of the cam disc that when the track follower 102 is moved through the last part of the selected one of the three tracks it will result in landing the tone arm to engage its stylus 16 on the record of the size in question in a start-of-playing position. The track arrangement can therefore also be referred to as the landing track arrangement.

FIGURES 3 and 4 illustrate the operation of the phonograph in the case of feeling and ejection of a record of medium size, for example a 10" record.

As will be clearly understood from these figures, the tone arm is moved inwardly controlled by the inward movement of the track follower 102 in the feeling track 138 until the abutment 136 engages the edge of the 10" record. In this position further inward movement of the tone arm is prevented by the engagement between the abutment 136 and the edge of the record and therefore the spring 140*a* will yield to the position shown in FIGURE 3 causing the track follower 102 to enter into and select the track 142 which is designed in accordance with 10" records and controls the further movement of the tone arm to be landed in the correct start-of-playing position on a 10" record after the same has been ejected and dropped to the turntable.

Each of the three tracks 140, 142 and 144 is provided with portions at different radial distances from the center of the cam disc and eccentric portions as will be exemplified in the following with an explanation of the various portions of the 10" track 142 by reference to FIGURE 2. The first portion $142^1$ of this track is concentric with the cam disc and operable to retain the feeler and ejector abutment 136 in engagement with the edge of the lowest record in the stack A. The track 142 hereafter continues in an inwardly leading eccentric track portion $142^2$ which causes the cam follower 102 to be moved so much inwardly that the ejector abutment 136 pushes the lowest record in the stack sufficiently sidewards to bring its center hole out of alignment with the top portion 88 of the center spindle 80 and relieve the record to descend along the center spindle to the turntable such as illustrated in FIGURE 4. The track 142 hereafter continues in a further inwardly leading eccentric track portion $142^3$ which swings the tone arm further inwardly sufficiently to bring its stylus 16 substantially vertically above the initial sound groove of the record which has now been dropped to the turntable. The last part of the track 142 is a concentric track portion $142^4$ in which the tone arm is retained in the position with the stylus in the correct start-of-playing position. During the passage of the track follower 102 in the track portions $142^3$ and $142^4$ the tone arm is lowered to engage the stylus in the sound groove of the record. This lowering is controlled by an inclined portion of the raising cam arrangement 96*a* which presses the roller 98 down against the action of the spring 100 to tilt the raising lever 70 anticlockwise until it assumes the same tilted position disengaged from the nut 74 as before the cam disc was started. The tone arm has been entirely lowered before the cam disc again is arrested and the gear wheel 42 disengaged from the turntable bushing 40.

It will be appreciated that the tracks 140 and 144 controlling the movements in the case of 7" and 12" records respectively are provided with portions corresponding to those described hereinabove with reference to the track 142, and that the selection of these tracks in the case of a 7" record is caused by allowing the track follower 102 to move inwards without pressing the spring 140 outwardly, while the selection of the track controlling the movements in the case of a 12" record causes the spring 140 to be pressed further outwardly from the position shown in FIGURE 3 until the entrance to the track 144 is opened.

As already explained hereinabove the stop-and-start control arm 54 serves to pull the gear wheel 42 in the direction to retain its engagement between the cam disc 94 and the turntable bushing 40 as well as to disengage the gear wheel 42 from the turntable bushing 40 by engaging the gear wheel in the recess 128 in the periphery of the cam disc.

The stop-and-start control arm 54 also serves to operate the switch 24 to close the switch when moved in the start direction and open the switch when moved in the stop direction, as indicated by the arrows in FIGURES 2, 3, 4 and 5.

The movement of the stop-and-start control arm 54 to its start position is controlled by the ballast arm 18 when the latter is swung inwards so that bringing the ballast arm to the necessary position in which it stabilizes the stack of records also will result in the starting of the phonograph. The movement of the stop and start control arm 54 to the stop position can also be caused by swinging the ballast arm outwardly.

The phonograph also provides for an automatic stop after playing of the last record and to this purpose a stop control abutment 150 is provided on the top of the cam disc 94 and operable to engage an abutment 152 on a projection 154 of the stop-and-start control arm 54 which extends over the cam disc.

The pin-and-slot connection 56, 58 between the stop-and-start control arm 54 and the lever 46 is further so provided that when the stop-and-start control arm 54 is moved to the stop position it will preferably cause the lever 46 to be slightly pushed so as to disengage the gear wheel from the turntable bushing 40 when the motor switch 24 is opened.

In order to facilitate the survey of FIGURES 2, 3 and 4 the details of the stop-and-start control arrangement are omitted in these figures. These details are, however, clearly shown in FIGURE 5 and reference is therefore made to FIGURE 5 in the following explanation of the stop-and-start control arrangement.

At the lower end of the ballast arm spindle 118, 122 there is secured a disc-shaped member 156 which rotates when the ballast arm is swung. In order to retain the ballast arm in raised position when it is swung out, a pin 158 is secured below the chassis 10. The pin 158 has an annular groove 160 or the like in which a part of the periphery of the disc member 156 can engage when the ballast arm is lifted and swung out. When the ballast arm is swung in and assumes the position in which it must be lowered to engage the stack of records, a recess 162 in the periphery of the disc member 156 aligns with the pin 158 and allows the ballast arm to be lowered with the pin 158 engaged in the recess 162.

The disc member 156 has a second peripheral recess 164 in which one end 166 of an L-shaped switch control lever generally designated by 168 is received. The switch control lever 168 is swingingly supported on a pin 170 secured to and extending below the chassis. The switch control lever 168 further is designed to be moved between two interior positions by snap action and to this purpose a snap action hairpin spring 172 is interposed between a notch 174 in the lever 168 and a notch 176 or the like in a suitable member secured to and extending below the chassis. The other part of the switch control lever 168 is designated by 178 and has a pin 180 which engages in a slot 182 in the switch control arm as well as a pin 184 which engages in a control member 186 for the switch 24.

The arrangement here described is so designed that when the ballast arm is lifted to bring the peripheral portion thereof in alignment with the slot 160 in the pin 158 and the ballast arm thereafter is swung out, the one end $164^1$ of the recess 164 will engage the end 166 of the switch control lever 168 to cause this lever to be swung anticlockwise about the pin 170 which will result in movement of the stop-and-start control arm 54 to the stop position due to the engagement of the pin 180 in the slot 182 as well as movement of the switch control member 186 to open the switch due to the engagement of the pin 184 with the switch control member 186.

When the ballast arm is swung in the other end $164^2$ of the recess 164 will engage the end 166 of the switch control lever 168 and cause it to swing clockwise as seen in FIGURE 5 which will result in movement of the stop-and-start control arm 54 to the stop position and closing of the switch 24.

As previously explained the stop-and-start control arm 54 is held in substantially horizontal position by means of the spring 124. This is the position indicated in dotted lines in FIGURE 8 and as it is clearly seen in this figure the horizontal position of the arm 154 is such that the abutment 152 thereof is above the stop control abutment 150 on the cam disc.

The shoulder 120 on the ballast arm spindle is so disposed relative to the top surface of the stop-and-start control arm 54 that when the ballast arm engages a single record on the center spindle the parts are in the position indicated in dotted lines in FIGURE 8 with the shoulder 120 slightly above the top of the stop-and-start control arm 54.

When, however, the last record has been dropped the ballast arm is lowered further by gravity into the position shown in full lines in FIGURE 8, and due to the weight of the ballast arm structure the shoulder 120 presses on the top of the stop-and-start control arm 54 and tilts it against the action of the spring 124 so as to bring the abutment 152 down to a position preparing the automatic stop of the phonograph when the cam disc is again started after the last record has been played.

As will be appreciated from FIGURE 2 the stop control abutment 150 is so located on the cam disc that when the latter has been started it will engage the abutment 152 shortly after the cam disc has started to rotate. As it further will be appreciated from the drawings the engagement between the abutment 150 and the abutment 152 will transmit the rotation of the cam disc to the stop-and-start control arm 54 to move it in the direction of the stop position and when the stop-and-start control arm is moved to that position the movement will be transmitted to the switch control arm 168 which will be swung anticlockwise and cause the switch 24 to be opened as well as to the lever 46 which will be pushed to disengage the gear wheel 42 from the turntable bushing 40.

The mechanism causing control of the start of the cam disc after playing of the record is a trip starter arrangement shown in FIGURE 5 and in section in FIGURE 7.

The trip starter arrangement is supported on a pin 190 secured to and extending below the chassis and having a body portion 192 and a portion 194 of reduced diameter. The trip starter comprises two levers, a front lever 196 the end 198 of which extends to near the turntable bushing 40 and a rear lever 200 which is adapted to be engaged by an abutment 202 which projects laterally relative to the cam follower arm 104.

The two trip starter levers 196 and 200 are both supported on the pin 192 to swing about this pin. The lever 200 is swingingly arranged about the portion 194 of the pin 192 and rests upon a washer 204 secured to the pin portion 194 so that the lever 200 can swing about the pin. The lever 196 rests on the top surface of the lever 200 and has a slot 206 so that the lever 196 is mounted for swinging as well as reciprocating movement. To retain the lever 196 in its most projecting position a spring 208 is interposed between a flap 210 at the end of the lever 196 and a flap 212 on the lever 200. The rear end of the lever 200 has a downwardly extending flap 214 arranged in a position to be engaged by the projection 202 when the tone arm swings inward so as to thereby swing the entire lever structure 196, 200 anticlockwise as seen in FIGURE 5.

On the turntable bushing 40 there is arranged a projecting nose 216 and the front end 198 of the lever 196 is so located that when the lever structure 200, 196 is swung clockwise, the front end 198 will be engaged by the projecting nose 216 on the turntable bushing 40.

As long as the swinging of the trip starter structure takes place at a velocity which is governed by the pitch of the playing groove of the record each revolution of the turntable bushing will cause the rotating nose 216 to engage the front end of the lever 196 so as to push this lever back in anticlockwise direction. As will be understood from FIGURE 7 the suspending of the levers 196 and 200 on the pin 192, 194 forms a friction link between the two levers so that the lever 196 can be pushed back against the friction of this link without causing the lever 200 to be pushed back.

When after playing of the record the stylus passes through the outlet groove of the record which usually has an increased pitch, the velocity at which the trip starter levers are swung anticlockwise as seen in FIGURE 5 will be increased, and accordingly the rotating nose 216 will be able to engage the front end 198 of the lever 196.

Adjacent its center, the cam disc has a raised cam portion 218 including an abutment 220 opposite which the lever 196 has an abutment 222. When the lever end 198 is engaged by the nose 216 this will cause an increased anticlockwise swinging of the lever 196 which will result in engagement of the abutment 222 against the cam abutment 220 so as to thereby transmit the power from the turntable bushing through the lever 196 to the cam disc to which an initial rotation thereby will be transmitted sufficient to bring the gear wheel 42 out of the recess 128 in the periphery of the cam disc and thereby engage the gear wheel 42 with the turntable bushing 40.

On the trip starter lever 196 there is arranged a wire spring 224 the one 226 of which is secured to the lever 196 and the other end of which at 228 is allowed to pass freely through a hole in a flap 230 on the lever 196. This spring is bent at 232 and when the lever 196 is swung as described the spring will be tensioned by its engagement against the cam portion 218 and as soon as the lever 196 has been relieved from its engagement with the rotating nose 216 the spring will cause clockwise movement of the lever 196 to bring it free of the rotating nose to avoid reengagement after one further revolution of the turntable which would give rise to noisy operation.

The specific construction of the record ejector system is illustrated in the perspective views FIGURES 9–11, and further modifications thereof are shown in FIGURES 12–22.

In general terms this modification, which may be applicable in connection with any record changing phonograph having edge push, provides an improved security for bringing the record ejector knob into engagement with the lowermost record only, and imparting to that record a sideward edge push, in such a manner that the record will be fed down, irrespective of the size of the record, according to the above modifications the record ejector mechanism is further so designed that it will operate satisfactorily even with warped records which has previously caused considerable troubles. The ejector mechanism also operates satisfactorily with any type of profile at the edge of the records.

In general terms the ejector mechanism provides for an inclined guiding surface extending below the edge push member in the downward and inward direction. The ejector member or knob and said guiding surface are resiliently arranged in such a manner that the top of the inclined guiding surface, when the ejector knob is out of engagement with the edge of a record is lying above the horizontal plane through the lower surface of the lowermost record in the stack on the platform of the centre spindle of the phonograph. Thus the ejector member by its engagement with the edge of the record will slide downwardly to the correct position of engagement.

It is thus possible to decrease the height of the ejector knob so that it is capable of engaging practically any thickness of records. Further advantages will appear from the following specification of these embodiments.

As shown in FIGURES 9–11 an inclined surface 240 is arranged below the ejector knob 136 extending downwardly and facing the edge of the record during the inward movement of the tone arm.

The top edge 242 of the inclined surface 240 is so adapted that when the tone arm approaches the edge of the record it will assume a position in a horizontal plane somewhat higher than the bottom plane of the record on the center spindle while the lower end of the inclined surface 240 will extend downwardly below said plane.

Furthermore the top edge 242 is arranged at such an angle with the tone arm 14 that said edge 242 in the position of engagement between the knob 136 and the edge of a large size record, such as, for instance, a 12" record, will assume a position in which said edge 242 is substantially tangential with respect to said large size record such as indicated in FIGURE 10 and in full lines in FIGURE 13 where the large size record is marked B.

Also as shown in FIGURES 11 and 13 in dotted lines, when the arm 14 is swung inwardly to engagement between the knob 136 and a small size record, such as a 7" record, the edge line 242 will assume a position in which it forms a small angle with the tangent at the point of engagement with the record.

The advantages of this arrangement will be more fully understood from the following explanation with reference to FIGURES 14 through 17.

The knob 136 is in the form of an inverted cone and the guiding surface 240 is so adapted that its top edge 242 is substantially tangential to the lower periphery of the knob 240. A vertical section through the feeding arrangement perpendicular to the edge 242 will therefore as shown in FIGURES 14, 15 and 18, show a profile with an acute angle $v$. The ejector arrangement will approach the edge of the record in a manner shown in FIGURE 14 or shown in full lines in FIGURE 18. Hereby the inclined surface 240 will engage the record at the lower edge of its periphery, and by this engagement the record ejector arrangement will be moved in a downward direction against the action of spring 100 (FIGURE 6) which biases the raising lever 70 so as to assume the engaging position shown in FIGURE 15 or in dotted lines in FIGURE 18, in which a thick, large size record is wedged into the angle $v$ so as to thereby secure a safe action.

It will be understood that the inclined surface 242 will determine that horizontal plane in which the ejector knob 136 is to perform its pushing action or in other words, the inclined surface serves the purpose always to bring the knob into its correct position relatively to the edge of the next record to be pushed down. Therefore it does not matter whether the edge portion of the record is warped or whether the record at its edge has a profile which is more or less round or wedge shaped, because the largest size records will always be wedged at their edge into the angle $v$.

Small size records such as 7" records are in practice always considerably thinner than larger size records such as 10 or 12" records. The operation for small-size, relatively thin records is illustrated in FIGURES 11, 16, 17 and 19 which are end views of the arrangement.

Because the edge 242 in this position of the ejector arrangement forms an angle with the tangent to the record at the point of engagement with the knob 136, the front point of the knob 136 is disposed in that case behind the front point of the edge 242 so that the thin record cannot be engaged by the knob 136 until the ejector mechanism has been moved down to such an extent that a horizontal surface 244, see FIGURES 11 and 19, is in the same plane as the plane of the under side of the lowermost record.

In practice the height of the knob 136 can be kept so low that it is slightly lower than the thickness of the thinnest record to be handled.

As an example of an adequate dimension of the knob 428 the height thereof may be .6 mm., and the conicity so adapted that its conical surface forms an angle of approximately 55° with a plane vertical to the axis of the knob.

The operation of the phonograph and the ejector arrangement is in more detail as follows:

When the playing of a record has been terminated and the tone arm stylus passes in the outlet groove of the record the trip starter arrangement will be actuated in the manner described in connection with the trip starter so as to cause engagement of the cam gear wheel 42 whereby the cam disc starts to rotate.

As also described the tone arm is immediately raised from the record to a position with the top of the abutment 136 slightly below the stack of records on the center spindle. When the cam follower 102 is engaged by the end wall 132 of the playing recess 130 the tone arm is swung out to a most exterior position which is retained during the movement of the cam follower through the track 134. In this position the tone arm is further raised so that when the tone arm is swung inwardly under control of the track 138 to a position adjacent the lowermost record of the stack the engagement between the feeler and ejector arrangement on the tone arm and the edge of the lowest record will take place between the inclined surface 240 and the edge of the record.

Hereby the tone arm is pressed slightly down with the inclined surface 240 sliding along the edge of the record, the ballast arm 18 preventing the stack of records from being tilted. This depression of the tone arm is possible because the spring 109 will yield.

Hereafter the ejector knob 136 comes into engagement with the edge of the record and prevents further inward movement of the tone arm with the result that according to the size of the record the spring 140a, which forms a selector member for the appropriate one of the three cam tracks 140, 142 and 144 will be pressed outwardly if the record is a medium or large size record, for example a 10" or a 12" record, while if the record is a 7" record the cam follower 102 will be moved directly into the interior track 140.

Since, all the three tracks 140, 142 and 144 have their first portion concentric with the cam disc, the ejector knob 136 will be retained in its engagement with the edge of the record and during the further inward movement of the track follower 102 as caused by the track portion 142$^2$ of the track 142 and the corresponding portions of the other tracks, the tone arm will be moved slightly more inwardly sufficient to push the record engaged by the ejector knob 136 sidewardly to relieve it from the platform 90 on the center spindle so that it will descend to the turntable guided on the center spindle 80.

The tone arm is thereafter caused to be moved further to its start-of-playing position by being moved inwardly to the correct start-of-playing position of the stylus member under the control of the track portion 142$^3$ and the tone arm is lowered to engage the stylus in the initial sound groove of the record now resting on the turntable, this operation being completed when the cam disc again comes to rest.

When the last record of a stack has been supplied to the turntable the ballast arm structure descends by gravity to the position shown in full lines in FIGURE 8 which results in tilting of the start-and-stop control arm 54 to the position also shown in full lines in FIGURE 8.

When, after start of a cam disc after playing of the last record, the cam disc has rotated a relatively small angle the stop control abutment 150 engages the abutment 152 which results in movement of the stop-and-start control arm 54 in the stop direction. Hereby the engagement between the notch 182 in the stop-and-start control arm 54 and the pin 180 on the switch control lever 168 causes the switch control lever to swing anticlockwise to open the switch 24 and simultaneously the cam disc is stopped, its abutment 150 being in engagement with the abutment 152.

This stop position may be so that the cam follower 102 has just been moved to the entrance of the track 134 so that the tone arm in the stop position is left in its raised exterior position allowing the records to be easily moved and the center spindle loaded with a new stack of records.

Before loading the center spindle with a new stack of records the ballast arm is lifted to the position aligning the disc member 156 with the recess 160 in the pin 158 so as to allow the ballast arm to be swung outwardly.

When the ballast arm after the center spindle has been loaded with a new stack of records is swung in it will cause clockwise swinging of the switch control arm 156 as previously described so as to start the phonograph.

It will be understood that different modifications are possible within the basic idea of the invention.

A modification is shown schematically in FIGURES 20 and 21. Here the arm 216a carrying the ejector arrangement is only shown schematically. The resiliency of the guiding surface is here provided in the ejector member itself, which is in the form of a conical part 218a forming the inclined guiding surface and an inverted cone 220a forming the ejector. The parts are arranged on a reciprocable pin 222a which is adapted to be pushed downwardly against the action of a spring 224a into the position thereof shown in FIGURE 21.

A further modification of the ejector arrangement in accordance with the present invention is shown in FIGURE 22. The inclined surface 226a terminates in this embodiment in an inclined edge 228a above which extends an inclined ejector surface 232a which terminates in a horizontal edge 230a. The angle of the edge 228a is so adapted to the position of the ejector surface 232a that in the case of engagement with a large-size record its edge will be engaged near the upper left hand end corner of the surface 232a while a small-size, thin record will be engaged near the lower right hand end corner of this surface.

One important feature of my invention is that the pick-up is controlled to travel from the end of a record playing position to the beginning of a record playing position through a path in which it engages the edge of the next record to be played and that by this engagement the remaining travel path is selectively determined in accordance with the size of the record to be played.

Another important feature of my invention is that the pick-up arm during its path of travel simultaneously engages the lowermost record in the stack to release it to be fed to the playing position.

Still a further important feature of my invention is that the arm extending radially above the top of the stack of records to rest thereupon to keep the records in horizontal position simultaneously is provided with means for switching on and off the motor.

This has in practice been found very convenient. It has always been a problem in record changers to stabilize the records in horizontal position. The problem can be solved by a lateral support for instance like a jib in the embodiment of FIGURES 1 through 11, in which case the arm is of less importance. Such lateral supporting member can, however, be avoided and I found that the top supporting arm is efficient. The use of such top supporting arm means that the person putting records on the phonograph will at any event also have to put the supporting arm in its right position, and I have then found it convenient to combine the movement of this arm with switching on the motor, because that gives only one operation to start the phonograph.

As a result of the simplification attained by the features here mentioned it will be appreciated that the number of levers and movable parts in the phonograph has been considerably decreased. In fact my new phonograph is able to play records of different sizes mixed among each other. In such phonographs it has always been a problem to adjust the pick-up travel path in accordance with the size of records and to feed down the new record because in most cases also the feeding mechanism will have to be adjusted in accordance with the size of records.

In my construction I attain a simplification by the specific manner described by which I select the travel path of the pick-up and by further using the pick-up itself as record feeding control member I have been able to avoid a considerable number of moving parts.

It will be understood, however, that different modifications can be used within the scope of my invention.

I claim:

1. In a record changing phonograph having a support for a stack of records in spaced relationship from the playing position in the form of a platform from which the records can be sequentially released by being sidewardly displaced: a ballast arm operable to engage the top of said stack of records to retain them in horizontal plane, a record feeding arrangement for imparting a sideward movement to the lowermost record of said stack relatively to the other records thereof comprising an abutment member operable to engage the edge of said phonograph record, an inclined surface extending from below said member in a downward direction and in the direction against said support, said inclined surface having a top edge in a plane substantially parallel with a plane through the surface of said lowermost record, and positioning means for said record feeding member and said inclined surface operable to make them assume a relative position, when out of engagement with the edge of said lowermost record in which said top edge of said inclined surface is above the bottom plane of said lowermost record and in which the lower portion of said inclined surface is below said plane, including resilient means enabling said abutment member to be moved downwardly in the direction toward said bottom plane of said record by sliding engagement of said inclined surface against the edge of said record.

2. A record feeding system for use in a record changing phonograph having a support for a stack of records in spaced relationship from the playing position thereof said support including a platform from which the records by a sideward displacement can be released sequentially comprising, means operable to stabilize the records in horizontal plane, feeding means operable to engage the edge of the lowermost record in said stack including guiding means for said feeding means operable by the engagement between said feeding means and said phonograph record edge for bringing said feeding means into a position of substantial alignment with the plane of said lowermost record, means for moving said feeding means in a reciprocable path to impart a sideward push to said lowermost record and means for resiliently positioning said feeding means and said guiding means in an initial position in which a portion of said guiding means is in alignment with a plane through the lower surface of said lowermost record.

3. For use in an automatic phonograph having a supporting platform for a stack of records, a feeding arrangement for engaging the edge of the lowermost record in said stack to push said record sidewardly to disengage it from said platform, comprising a reciprocable supporting member, control means operatively connected with said supporting member to effectively control the movements thereof a record edge engaging knob secured to said supporting member, an inclined guiding surface extending downwardly and towards the centre of said stack of records from below said knob, said supporting member being positioned resiliently in such a plane relatively to the lower surface of the lowermost record in said stack that a portion of said guiding surface is in alignment with said plane, and ballast means for retaining said stack of records substantially in the same plane during the feeding action.

4. A record feeding system for use in an automatic phonograph having a supporting platform for a stack of records from which the lowermost record can be released by a sideward movement and means operable to stabilise records supported on said platform in a predetermined plane comprising: a swingingly arranged arm, a knob secured to said arm, an inclined surface extending below said knob in the downward direction and in a direction against said stack of records, means for positioning said arm in a plane with a portion of said inclined surface in alignment with a plane through the lower surface of said lowermost record in said stack, means for swinging said arm to bring said knob into engagement with the edge of said lowermost record, and resilient means for enabling said arm to move vertically with respect to the plane of said record in response to the engagement of said inclined surface against the edge of said lowermost record.

5. For use in a phonograph having a supporting platform for a stack of records from which platform the lowermost record can be relieved by a sideward displacement and stabilizer means for holding said records in a predetermined plane: a displacement arrangement for engaging the edge of the lowermost record in said stack comprising a feeding member and an inclined surface extending below said feeding member in the downward direction and in a direction toward said stack of records, a support for said feeding member and said inclined surface, means for moving said support in a path to engage said inclined surface against an edge portion of the lowermost record in said stack, and means operable by said engagement to bring said feeding member into alignment with said lowermost record.

6. An edge push arrangement for imparting a sideward movement to the lowermost record in a stack of records forming a magazine in a record changing phonograph having a platform for supporting said magazine from which platform the lowermost record can be released by a sideward push and means operable to stabilize records supported on said platform in a predetermined plane comprising: first means forming a pushing member and a guiding surface arranged adjacent said pushing member, supporting means for said pushing member and said guiding surface, means for moving said supporting means to initially engage said guiding surface against the edge of said lowermost record, and means effectively connected with said first means and operable in response to said engagement to bring said pushing member to assume its correct engaging position.

7. An edge pushing system to control drop of a phonograph record from a supporting platform in a record changing phonograph having means operable to stabilize records supported on said platform in a predetermined plane comprising a pushing knob for engaging the edge of said phonograph record, a supporting member for said pushing knob, means for moving said supporting member to effect said engagement, and means forming an inclined surface and operative to guide said pushing knob into the engaging plane thereof to thereby assume its correct position of engagement with said record edge and operable to control simultaneously therewith the relative position between said engaging plane and the bottom plane of said record in dependence on the diametric dimension of the record.

8. A drop control system for releasing a phonograph record from a supporting platform in a record changing phonograph comprising: a knob for engaging the edge of said record, an elongated supporting arm for said knob swingingly arranged in a plane substantially parallel with the plane of said record, and with said knob slightly above the topside of said record, means for resiliently supporting said arm for movement in a downward direction, and means forming an inclined guiding surface extending below said knob in the downward direction terminating below the underside of said record and extending in a direction towards the centre thereof, said inclined surface defining at its point of connection with said knob an edge forming an angle with said pivotable arm which in the case of engagement between said knob and a large size record substantially coincides with the tangent to the point of engagement with said record and which in case of engagement between said knob and a small size record forms an acute angle with said tangent.

9. A record changing phonograph having in combination a turntable, means for rotating said turntable, a platform for supporting a stack of records in spaced relationship from said turntable and from which the lowermost record can be released to the turntable by a sideward push, a tone arm including stylus means for engaging the sound track of said records, a record edge engaging knob on said tone arm, an inclined surface extending below said knob in the downward direction and in a direction of said platform, means operative between each playing of a record for moving said tone arm in a path to engage said inclined surface against the edge of the lowermost record in the stack on said platform, resilient means operative in response to said engagement between said inclined surface and said record edge to enable movement of said tone arm to assume a position in which said record engaging knob is brought into proper alignment with said lowermost record, said means for moving said tone arm further being operable after said engagement to move said tone arm inwardly a distance sufficient to release said lowermost record from said platform by said side push, and means operable to land the tone arm with the stylus thereof on the record after release of the latter by said side push in the start-of-play position.

10. In a record changing phonograph in combination: a turntable, means for rotating said turntable, a platform for supporting a stack of records in spaced relationship above said turntable, a movable tone arm having a playing member comprising a stylus tip, ballast means for stabilizing said stack of records in a plane substantially parallel with said turntable, means for resiliently supporting said tone arm to enable movements thereof in essentially the vertical direction, cam means for moving said tone arm in a path between each playing of a record, said cam means including a plurality of cam tracks each of which corresponds to movement of said tone arm to be landed on a record of a predetermined size of a record, said cam means being operable to bring said tone arm in a record size feeling position thereof adjacent the edge of the record of any size to be played, record size feeler means operatively connected with said tone arm and said cam means and operative in said feeling position to effectively select the appropriate cam track each of said cam tracks having an initial portion operable to swing said tone arm inwardly, a feeding knob on said tone arm operable to engage the edge of the lowermost record during such inward swinging to release said lowermost record from said platform in response to said inward swinging of said tone arm and guiding means operable to guide said tone arm into a plane with said feeding knob substantially in alignment with the plane of said lowermost record before the engagement therebetween.

11. A tone arm moving and record feeding mechanism for use in a record changing phonograph having a turntable and a platform for supporting a stack of records in spaced relationship to said turntable comprising a plurality of cam means each operable for selectively moving said tone arm in a path between each playing of a record corresponding to a predetermined size of record to be played, record size feeler means on said tone arm operable to select the appropriate of said cam means corresponding to the next record to be played, each of said cam means having a portion moving said tone arm in inward direction with a portion of said tone arm substantially in the plane of the lowermost record in said stack, said portion of said tone arm being provided with an inclined guiding surface positioned to initially engage the edge of said lowermost record and a record edge engaging knob positioned at the top of said guiding surface and effectively guided by said inclined guiding surface to locate the top of said engaging knob below the plane of the top surface of said lowermost record upon engagement with said edge of said lowermost record.

12. A record changing phonographic apparatus comprising in combination: a turntable, power means for rotating said turntable, a record playing member, a platform for supporting a stack of records in a position spaced from said turntable, means for stabilizing said record stack in a plane parallel with said turntable means for controlling the movement of said record playing member in a path between the position corresponding to termination of the playing of a record and the beginning of the playing of another record, driving means for said control means, means for rendering said driving means inoperative during the playing of a record, a knob operable to engage the edge of the lowermost record in said stack extending on said record playing member arm, an inclined surface extending below said knob, and means operable during the travel of said record playing member to engage said inclined surface against the edge of the lowermost record in said stack so as to position said knob in the vertical direction thereof relative to said lowermost record and thereby bring said knob into essential aligned engagement with said record edge to release it from said platform.

13. In a record changing phonograph in combination: a turntable, power means for rotating said turntable, a platform spaced from said turntable for supporting a stack of records, means for stabilizing said record stack in a plane parallel with said turntable a movable tone arm, a record pushing member on said tone arm for engaging the edge of the lowermost record in said stack to displace it sidewardly to release it from said platform to be fed down to said turntable, a trip mechanism for said tone arm comprising a cam disc having at least one cam track, a cam follower adapted to move in said cam track, a rigid connection between said cam follower and said tone arm, guiding means on said tone arm operable upon the approach of said record pushing member to the edge of the lowermost record in said stack to bring said pushing member into the plane of said lowermost record, and the cam track portion of said cam disc for guiding said cam follower in a path enabling said engagement between said member on said tone arm and the edge of said record to sidewardly displace said record to be fed down on the turntable.

14. In a record changing phonograph having a turntable, a support for a stack of records spaced from said turntable, from which the lowermost record by sideward displacement can be released to be fed down to the turntable, means for stabilizing said record stack in a plane parallel with said turntable and a movable tone arm, the combination of a trip mechanism for moving said tone arm, and means associated with said tone arm for engaging the edge of the lowermost record in said stack to impart a sideward movement thereto sufficient to release said record from said platform, said trip mechanism including a plurality of trip controlling members each of which corresponds to movement of the tone arm in a path corresponding to the size of said lowermost record, means operable in response to an angular position of said record engaging member on said tone arm adjacent the edge of said lowermost record and substantially in the plane thereof for effectively selecting the appropriate of said trip control members, and means operatively connected with said tone arm for selectively bringing said record engaging member into a plane in which said record engaging member will engage the edge of the lowermost record only.

15. A drop control system for use in a record changing phonograph having a turntable, a platform for supporting a stack of records in spaced relationship above said turntable, means for stabilizing said record stack in a plane parallel with said turntable comprising: an arm arranged for swinging movement substantially in the plane of the lowermost record in said stack, a knob on said arm for engaging the edge of said lowermost record, control means for swinging said arm into a position thereof in which said knob is adjacent the edge of said lowermost record, said swinging movement being of such a magnitude as to sidewardly displace said lowermost record by the engagement between said knob and the edge of said record to release it from said platform, and means for guiding the engagement between said knob and said record edge to bring an effectively increased portion of the height of said knob into engagement with records of large size and an effectively decreased portion of the height of said knob into engagement with the edge of records of small sizes.

16. In a record changing phonograph in combination: a turntable, means for rotating said turntable, a centre spindle extending above said turntable and having a platform for supporting a stack of records from which the lowermost record can be released by a displacement in sideward direction, means for stabilizing said record stack in a plane parallel with said turntable, a swingingly arranged tone arm, a record edge engaging knob on said tone arm, a plurality of tone arm trip controls for moving the tone arm between each playing of a record in a path producing engagement between said knob and the edge of the lowermost record in said stack to sidewardly displace said lowermost record to release it from said platform, and means for guiding said record edge engaging knob to effect engagement with the edge of said lowermost record with an effectively increased height in case of a large record and an effectively decreased height in case of a small record.

17. In a record changing apparatus of the kind wherein records, which may be of differing sizes, are supported in a stack and are transferred one by one from the bottom of the stack to a turntable whereon they are accumulated in a pile and the top side of the exposed record on the turntable is played by a record-playing member having a start-of-play position dependent upon the size of the record to be played: the combination with the turntable and the playing member of a support for the stack of records operable to support the lowest record of said stack laterally relative to its center hole in a position allowing said record to be sidewardly pushed to be disengaged from said support, a feeler and ejector member rigidly secured to said playing member, an inclined, downwardly and upwardly extending surface below said feeler member, means operable to keep the records on said support in a plane substantially parallel with said turntable, control means operatively connected with said playing member for guiding the playing member to feel the edge for testing the size of the bottom record of the stack and operable to engage said inclined surface against the edge of the bottom record, resilient means operatively connected with said playing member and operable in response to said engagement to cause downward movement of said ejector member until it engages the edge of said bottom record, said control means being thereafter operable to push said record off the support to procure its release from the stack, and guiding means in said apparatus for guiding the released bottom record to the turntable for subsequent playing by the playing member, said control means including means operable to guide the playing member to a start-of-play position appropriate to the record size.

18. In a record changing apparatus of the kind wherein records which may be of differing sizes and stabilized horizontally are supported in a stack and are transferred one by one from the bottom of the stack to a horizontal turntable whereon they are accumulated in a pile and the top side of the exposed record on the turntable is played by a record-playing member including a tone arm having stylus means and having a start-of-play position dependent upon the size of the record to be played: the combination with the turntable and the tone arm of a vertical center spindle having an upwardly facing shoulder for supporting the stack of records and allowing the lowest record to be sidewardly pushed to procure its release from the stack and descend to the turntable guided by said center spindle, said tone arm having an ejector knob and an inclined surface extending inwardly and downwardly therebelow, control means operatively connected with said tone arm for guiding said tone arm to feel the edge for testing the size of the bottom record of the stack and to engage said inclined surface against the edge of the bottom record by swinging said tone arm inwardly in a horizontal plane, a spring operatively connected with said tone arm and operable to be tensioned during further inward movement of said tone arm to cause said tone arm to be slightly lowered when said inclined surface slides on said record edge until said ejector knob engages said record edge, said control means being thereafter operable to push said record off said shoulder to procure its release to the turntable for subsequent playing, said control means including means operable to guide the playing member to a start-of-play position appropriate to the record size.

19. In a record changing apparatus of the kind wherein records, which may be of differing sizes, are supported in a stack and are released one by one from the bottom of the stack to a turntable whereon they are accumulated in a pile and the top side of the exposed record on the turntable is played by means of a tone arm having a start-of-play position dependent upon the size of a record to be played: the combination of a support for supporting the stack of records vertically spaced above the turntable and for releasing the lowermost record upon edgewise movement of said record, an ejector member on said tone arm and an inclined downwardly extending surface below said ejector member facing said fixed support, a rotatable cam member operatively connected with said tone arm for moving the tone arm from an end-of-play position to a start-of-play position, power means operatively connected with said cam member for rotating the cam member between each playing of a record, restraining means in said power means operable for limiting each such rotation to a predetermined angle, and starting means actuable for initiating rotation of the cam member on termination of the playing of a record, said cam member having control means operatively connected with said tone arm and operative during such rotation for bringing the tone arm from the end-of-play position and for moving the tone arm to feel the edge for testing the size of the lowermost record on the stack and thereafter to move the tone arm to a start-of-play position appropriate to the size of record tested, and moving the tone arm to engage said inclined surface against said record edge, and resilient means operatively connected with said tone arm and operable to yield in response to said engagement to enable said tone arm to be slightly lowered when said inclined surface slides on said record edge until said ejector member comes to engagement therewith, said control means being thereafter operative to impart edgewise movement to said lowermost record pushing it off the support to procure release of the latter from the stack and finally moving the tone arm to the appropriate start-of-play position.

20. In a record changing apparatus of the kind wherein records, which may be of differing sizes, are supported in a stack and are released one by one from the bottom of the stack to a turntable whereon they are accumulated in a pile and the top side of the exposed record on the turntable is played by means of a tone arm having a start-of-play position dependent on the size of record to be played: the combination of a support operative for supporting the stack of records vertically spaced above the turntable, an ejector member on said tone arm and an inclined downwardly extending surface below said ejector member facing said fixed support, a rotatable cam member operatively connected with said tone arm for moving the tone arm from an end-of-play position to a start-of-play position, power means operatively connected with said cam member for rotating the cam member between each playing of a record, restraining means in said power means operable for limiting each such rotation to a predetermined angle, and starting means in said power means for initiating rotation of the cam member on termination of the playing of a record, said cam member having a plurality of cam tracks each operable for a predetermined size of records to move the tone arm to be landed in start-of-play position, means for moving the tone arm to engage said inclined surface against the edge of the lowest record of the stack, resilient means effectively connected with said inclined surface and with said ejector member to enable said inclined surface to slide along said record edge until said ejector member comes into engagement therewith, the movement of the tone arm then being interrupted thereby testing the size of that record which will next be played, means operable to select the appropriate one of said cam tracks in response to said interruption of the tone arm movement then being operable for moving the tone arm further inwardly to push the tested record off the support to procure delivery of that record to the turntable.

21. In a record changing apparatus of the kind wherein records, which may be of differing sizes, are supported in a stack and are released one by one from the bottom of the stack to a turn-table whereon they are accumulated in a pile and the top side of the exposed record on the turn-table is played by means of a tone arm having a start-of-play position dependent on the size of record to be played: the combination of a support operative for supporting the stack of records vertically spaced above the turn-table, an ejector member on said tone arm and an inclined downwardly extending surface below said ejector member facing said fixed support, means operatively connected with said tone arm for moving the tone arm from an end-of-play position to a start-of-play position through a path to a position with said inclined surface adjacent the lowermost record of the stack and further inwardly to engage said inclined surface against the edge thereof, resilient means operatively connected with said tone arm to enable said inclined surface to slide along said record edge until said ejector member comes into engagement therewith, the movement of the tone arm then being interrupted thereby testing the size of that record which will next be played, means operative in response to said interruption of the tone arm movement to cause the tone arm to be landed in a start-of-play position on the record tested, said control means then being operable for moving the tone arm further inwardly to push the tested record off the support to procure delivery of that record to the turn-table, said control means including means for moving the tone arm to the appropriate start-of-play position after said delivery.

22. In a record changing apparatus of the kind wherein records, which may be of differing sizes, are supported in a stack and are transferred one by one from the bottom of the stack to a turn-table whereon they are accumulated in a pile and the top side of the exposed record on the turn-table is played by a tone arm having a record-playing member having a start-of-play position dependent upon the size of the record to be played: the combination with the turntable and the tone arm of a support for the stack of records, an ejector member on said tone arm and an inclined downwardly extending surface below said ejector member facing said fixed support, control means operatively connected with said tone arm for guiding the tone arm to resiliently engage said inclined surface against the edge of the bottom record of the stack so as to slide along said edge until said ejector member comes into engagement with said record edge, the control means being operable in response to said engagement to move said tone arm to a start-of-play position on a record of the size engaged, said control means being also operative after determination of the predetermined tone arm path to move the tone arm further inwardly with said ejector member engaged against the edge of said record thereby pushing it off the support to procure its release from the stack, and guiding means in said apparatus for guiding the released bottom record to the turn-table for subsequent playing by the playing member, said predetermined tone arm path thereafter being operable to guide the playing member to its start-of-play position appropriate to the record size.

23. In an automatic phonographic apparatus for playing a succession of records of differing sizes, of the kind wherein a series of records to be played is stacked in the phonograph, and records are delivered one by one from the stack onto a horizontal turn-table whereon they are accumulated in a pile and the top side of the exposed record played by means of a tone arm having a start-of-play position dependent on the size of said exposed record: the combination with the turn-table and the tone arm of control means operable for stabilizing each record prior to delivery to the turn-table in a horizontal position above the turn-table, an ejector member on said tone arm and an inclined downwardly extending surface below said ejector member facing said fixed support actuatable for feeling the edge of the lowermost stacked record for testing the size thereof, said control means including means operatively connected with said tone arm for resiliently engaging said inclined surface against said record edge so as to slide along said record edge until said ejector member comes into engagement therewith for pushing said lowermost record off its support in the stack to effect delivery of the tested record to the turntable ready for playing, and said control means including means for moving the tone arm after the record has been received on the turn-table to a start-of-play position appropriate to the size of the tested record.

24. In a record changing phonograph of the kind wherein a stack of records which may be of different sizes are supported and stabilized horizontally and transferred sequentially from the bottom of the stack to a horizontal turntable on which the exposed side of the top record is played by a record playing member including a tone arm having stylus means and having a start-of-play position governed by the size of the record to be played: the combination with the turntable and the tone arm of a vertical center spindle having an upwardly facing shoulder for supporting the stack of records and allowing the lowest record to be sidewardly pushed to procure its release from the stack and descend to the turntable guided by said center spindle, an ejector surface rigidly secured to said tone arm and having an upwardly and outwardly sloping surface facing said center spindle, an inclined surface extending inwardly and downwardly below said ejector member defining a wedge profile with the surface thereof, a cam disc operatively connected with said tone arm and operable to control in- and outward swinging of said tone arm and having a plurality of tracks for moving the tone arm in different paths each of which corresponds to a predetermined size of a record, a track follower capable of following each of said tracks and rigidly connected with said tone arm, control means operatively connected with said tone arm to control raising and lowering of said tone arm, said raising control means including a raising control cam, a tiltable lever and a spring biasing said tiltable lever against a portion of said raising control cam when said tone arm is raised, said swinging control means further including means operable to effectively select the appropriate one of said plurality of cam tracks which corresponds to the bottom record in said stack on said center spindle, the operation of said swinging control means and said tone arm raising control means being so timely related that said tone arm is swung inwardly raised to such a horizontal plane that the edge of the bottom record in said stack is engaged by said inclined surface below said ejector member whereby the tone arm is slightly pressed down against the action of said spring which biases said tiltable raising control lever against said raising control cam when said inclined surface slides on the edge of said record until said record edge is wedged between said inclined surface and said ejector surface, each of said selectable cam tracks having an inwardly leading portion operable after engagement between said ejector member and the record edge to swing the tone arm further inwardly sufficient to push said record off said shoulder to be released to its playing position on the turntable, each of said swinging control cam tracks having a portion thereafter operable to guide the tone arm to its start-of-play position governed by the size of the record and the operation of said raising control means being so timed relative to said swinging control means that said tone arm is lowered to said start-of-play position.

25. In a record changing phonograph of the kind wherein a stack of records which may be of different sizes are supported and stabilized horizontally and transferred sequentially from the bottom of the stack to a horizontal turntable on which the exposed side of the top record is played by a record playing member including a tone arm having stylus means and having a start-of-play position governed by the size of the record to be played: the combination with the turntable and the tone arm of a vertical center spindle having an upwardly facing shoulder for supporting the stack of records and allowing the lowest record to be sidewardly pushed to procure its release from the stack and descend to the turntable guided by said center spindle, an ejector surface rigidly secured to said tone arm and having an upwardly and outwardly sloping surface facing said center spindle, an inclined surface extending inwardly and downwardly below said ejector member facing said center spindle, a cam disc operatively connected with said tone arm and operable to control in- and outward swinging of said tone arm and having a plurality of tracks for moving the tone arm in different paths, each of which corresponds to a predetermined size of a record, a track follower capable of following each of said tracks and rigidly connected with said tone arm, control means operatively connected with said tone arm to control raising and lowering of said tone arm, said raising control means including a raising control cam, a tiltable lever and a spring biasing said tiltable lever against a portion of said raising control cam when said tone arm is raised, said swinging control means further including means operable to select the appropriate of said plurality of cam tracks which corresponds to the bottom record in said stack on said center spindle, the operation of said swinging control means and said tone arm raising control means being so timely related that said tone arm is swung inwardly raised to such a horizontal plane that the edge of the bottom record in said stack is engaged by said inclined surface below said ejector member whereby the tone arm is slightly pressed down against the action of said spring which biases said tiltable raising control lever against said raising control cam when said inclined surface slides along the edge of said record until said ejector member engages said record edge whereby the swinging movement of the tone arm is interrupted and the appropriate cam track which corresponds to the size of the record engaged is selected, each of said selectable cam tracks having an inwardly leading portion operable after the selection of said track to swing the tone arm further inwards sufficient to push said record off said shoulder to be released to its playing position on the turntable, each of said swinging control cam tracks having a portion thereafter operable to guide the tone arm to its start-of-play position governed by the size of the record and the operation of said raising control means being so timed relative to said swinging control means that said tone arm is lowered to said start-of-play position.

26. In a record changing phonograph of the kind wherein a stack of records which may be of different sizes are supported and stabilized horizontally and transferred sequentially from the bottom of the stack to a horizontal turntable on which the exposed side of the top record is played by a record playing member including a tone arm having stylus means and having a start-of-play position governed by the size of the record to be played: the combination with the turntable and the tone arm of a vertical center spindle having an upwardly facing shoulder for supporting the stack of records and allowing the lowest record to be sidewardly pushed to procure its release from the stack and descend to the turntable guided by said center spindle, an ejector surface rigidly secured to said tone arm and having an upwardly and outwardly sloping surface facing said center spindle, an inclined surface extending inwardly and downwardly below said ejector member facing said center spindle, a cam member operatively connected with said tone arm to control in- and outward swinging of said tone arm and having a plurality of cam means for moving the tone arm in different paths each of which corresponds to a predetermined size of a record a cam follower structure capable of being guided by each of said cam means and rigidly connected with said tone arm, control means operatively connected with said tone arm to control raising and lowering of said tone arm, and including a yielding means, said cam member further including means operable to effectively select the appropriate of said plurality of cam means which corresponds to the bottom record in said stack on said center spindle, the operation of said swinging control means and said tone arm raising control means being so timely related that said tone arm is swung inwardly raised to such a horizontal plane that the edge of the bottom record in said stack is engaged by said inclined surface below said ejector member whereby the tone arm is slightly pressed down against the action of said yielding means when said inclined surface slides along the edge of said record until said ejector member engages said record edge whereby said selector means is operated to select the appropriate cam means corresponding to the size of the record engaged, each of said selectable cam means being operable to retain the engagement between said ejector member and the record edge and to swing said cam follower structure to move the tone arm further inwards sufficiently to push said record off said shoulder to be released to its playing position on the turntable, each of said cam means having a portion thereafter operable to guide the tone arm to a start-of-play position governed by the size of the record and the operation of said raising control means being so timed relative to said swinging control means that said tone arm is lowered to said start-of-play position.

References Cited in the file of this patent

UNITED STATES PATENTS

| | | |
|---|---|---|
| 1,469,152 | Boumphrey | Sept. 25, 1923 |
| 2,484,775 | Zandelin et al. | Oct. 11, 1949 |
| 2,613,081 | Fisher | Oct. 7, 1952 |
| 2,616,708 | Vivie | Nov. 4, 1952 |
| 2,628,843 | Comstock | Feb. 17, 1953 |
| 2,637,558 | Fisher | May 5, 1953 |
| 2,743,109 | Mullaney | Apr. 24, 1956 |
| 2,818,263 | Dale | Dec. 31, 1957 |

FOREIGN PATENTS

| | | |
|---|---|---|
| 105,891 | Sweden | Nov. 10, 1942 |
| 110,392 | Sweden | Apr. 18, 1944 |
| 554,553 | Great Britain | July 8, 1943 |
| 590,176 | Great Britain | July 10, 1947 |